United States Patent [19]

Akita et al.

[11] Patent Number: 4,577,075
[45] Date of Patent: Mar. 18, 1986

[54] EARTHING SWITCH FOR GAS-INSULATED SWITCHGEAR APPARATUS

[75] Inventors: Kenji Akita; Minoru Sakaguchi; Hiroshi Suzuyama, all of Hitachi, Japan

[73] Assignee: Hitachi, Ltd., Tokyo, Japan

[21] Appl. No.: 691,912

[22] Filed: Jan. 16, 1985

[30] Foreign Application Priority Data

Jan. 18, 1984 [JP] Japan .................. 59-5602

[51] Int. Cl.⁴ .................. H01H 33/04; H02B 1/20
[52] U.S. Cl. .................. 200/148 R; 200/144 R; 361/341
[58] Field of Search .......... 200/148 R, 148 B, 148 F, 200/144 R; 361/341, 335, 333

[56] References Cited

U.S. PATENT DOCUMENTS 3,778,574 12/1973 Clark .................. 200/148 R
4,347,414 8/1982 Headley et al. .................. 200/144 R
4,354,220 10/1982 Oishi et al. .................. 361/341

FOREIGN PATENT DOCUMENTS 52-54761 12/1977 Japan .................. 200/148 R
57-27817 2/1982 Japan .................. 200/148 R
58-57226 4/1983 Japan .................. 200/148 R Primary Examiner—Robert S. Macon
Attorney, Agent, or Firm—Antonelli, Terry & Wands

[57] ABSTRACT

An earthing switch for gas-insulated switchgear apparatus is disclosed, in which conductor within an enclosure is provided with a stationary contact, and a moving contact is movably provided to connect with and disconnect from the stationary contact by an operating mechanism within an operating mechanism case which is mounted on a branch tube of the enclosure interposing an insulating plate therebetween. For connecting the moving contact to the enclosure electrically, a plurality of earthing bars are employed, and further, directions of electromagnetic forces generated between the moving contact and individual earthing bars are considered in the connection of the earthing bars. By virtue of the connection of the plurality of earthing bars, the influence of the electromagnetic forces acting on the moving contact can be reduced to a great extent.

7 Claims, 9 Drawing Figures

FIG. I
PRIOR ART
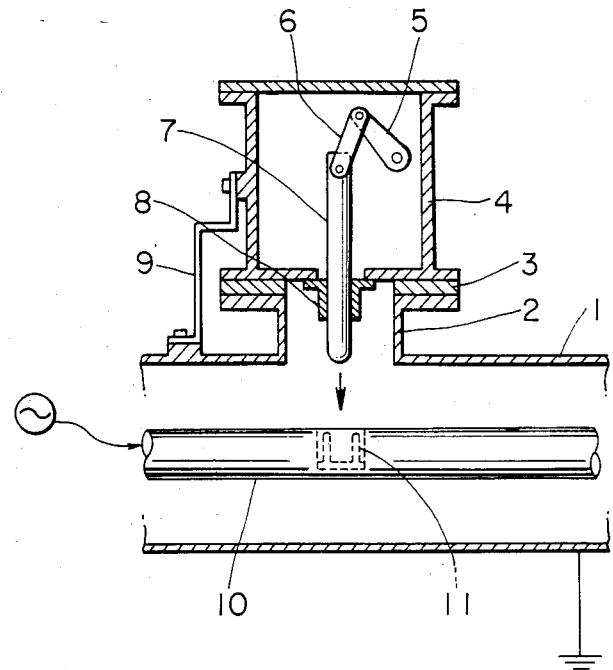
FIG. 2
PRIOR ART
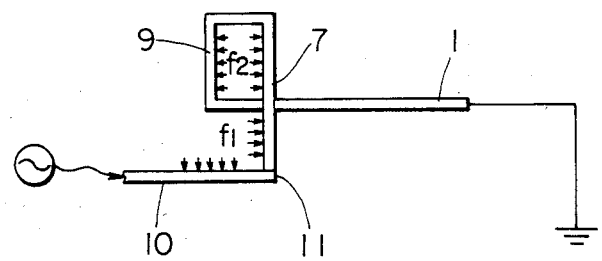

EARTHING SWITCH FOR GAS-INSULATED SWITCHGEAR APPARATUS

The present invention relates to an earthing switch for a gas-insulated switchgear apparatus.

Gas-insulated switchgear apparatus is generally provided with an earthing switch to ground a conductor of the voltage applied section accommodated and arranged in an enclosure thereby assuring safety of operators in maintenance and inspection of various parts thereof.

A conventional structure of the earthing switch is illustrated in FIG. 1.

An enclosure 1, in which a conductor 10 is insulatedly mounted, is usually grounded by an earthing lead. A branch tube 2 of the enclosure 1 has a flange, and an operating mechanism case 4 is attached to the flange removably with bolts or the like interposing an insulating plate 3 therebetween. Within the operating mechanism case 4, operating mechanism parts such as a lever 5 operable from the outside and a link 6, a moving contact 7 and a current collector 8 are arranged. The operating mechanism case 4 is connected to the enclosure 1 by an earthing bar 9 and grounded. When the earthing bar 9 is removed, the case 4 and the moving contact 7, are electrically separated from the enclosure 1, and hence, the earthing switch is adapted to be used as a terminal of a ground test switch for measuring an insulation resistance and the like.

In operation of the earthing switch, a rotating motion of the lever 5 operated from the outside is transformed to a vertical linear motion of the moving contact 7 by the link 6, and the moving contact 7 is brought into contact with a stationary contact 11 provided in the conductor 10 to ground the conductor 10.

When the earthing switch is turned on under a condition in which the conductor 10 is being charged, a current flows through the conductor 10, stationary contact 11, moving contact 7, current collector 8, operating mechanism case 4, earthing bar 9 and enclosure 1 to ground.

A current path in this case is shown schematically in FIG. 2.

As a result of the current flowing through the path, electromagnetic forces act on the moving contact 7. That is, the electromagnetic force $f_1$ due to a mutual magnetic field effect with the conductor 10, and the electromagnetic repulsion force $f_2$ due to the current flowing through the moving contact 7 and that flowing through the earthing bar 9 are superposed to act on the moving contact 7. These electromagnetic forces act on the moving contact 7 in a direction to bend it away from the axial direction of the moving contact 7. This will cause the contacts 7 and 11 not to contact fully with each other at the instant of the turning on the earthing switch, resulting in the contacts being greatly damaged by the contacting force between them. Further, when the moving contact 7 is made thicker to withstand the bending by the electromagnetic forces, the operating system also tends to become large in size. In particular, as the capacity of a system in which the gas-insulated switchgear apparatus is used increases, the current turned on by the earthing switch also becomes larger, and this in turn requires to design a moving contact capable of withstanding further large electromagnetic force, resulting in the earthing switch of a larger size. Examples of the aforementioned earthing switch are well known from Japanese Utility-Model Publication No. 52-54761 (1977) and Japanese Utility Model Application Laid-Open (KOKAI) No. 57-27817 (1982), and further examples in which the earthing switch is utilized as a ground test switch are known from U.S. Pat. No. 3,778,574 and Japanese Patent Application Laid-Open (KOKAI) No. 58-57226 (1983) corresponding to U.S. Pat. No. 4,486,634.

An object of the present invention is to provide an earthing switch for a gas-insulated switchgear apparatus in which the influence of the electromagnetic forces which act on the moving contact as a bending force is reduced.

Another object of the present invention is to provide an earthing switch for a gas-insulated switchgear apparatus in which the influence of the electromagnetic repulsion force between the conductor and the moving contact is reduced to a great extent.

An earthing switch for a gas-insulated switchgear apparatus according to the present invention includes a stationary contact provided in a conductor within an enclosure, and a moving contact is movable to connect with and disconnect from the stationary contact by an operating mechanism within an operating mechanism case mounted on a branch tube of the enclosure interposing an insulating plate therebetween, and an earthing bar arrangement for electrically connecting the moving contact to the enclosure is particularly designed for the purpose. Specifically, a plurality of earthing bars are employed and the earthing bars are disposed relative to the moving contact, so that electromagnetic forces effected on the moving contact against the respective earthing bars are cancelled with each other. By virtue of such arrangement, the need to make the moving contact and the operating mechanism large can be eliminated, and the earthing switch for gas-insulated switchgear apparatus can be made in a small size.

The present invention will be apparent from the following detailed description taken in conjunction with the accompanying drawings, in which:

FIG. 1 is a sectional view of a conventional earthing switch;

FIG. 2 is a schematic current path diagram of the earthing switch of FIG. 1;

Figure 6:
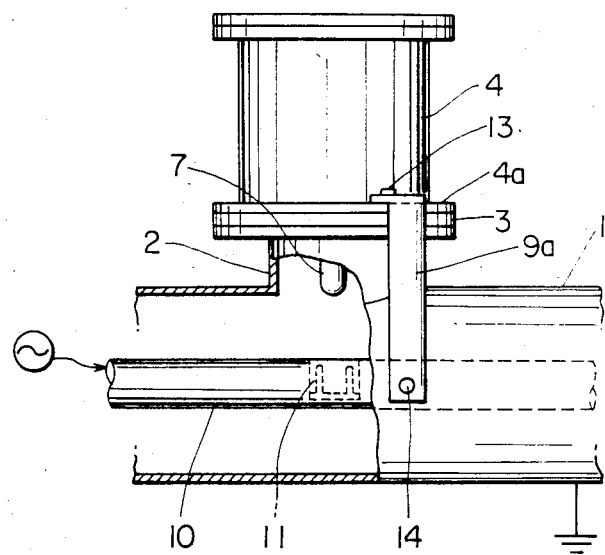
Figure 7:
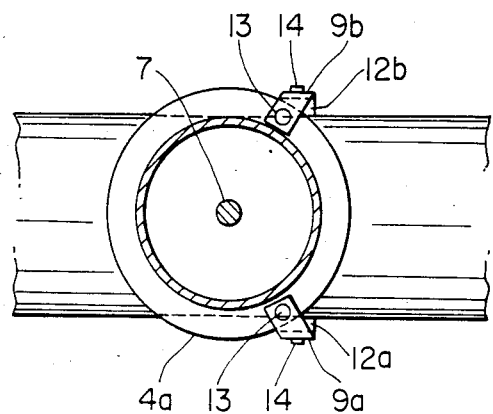
Figure 8:
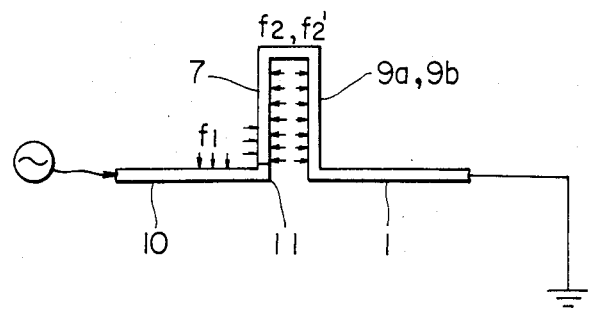
Figure 9:
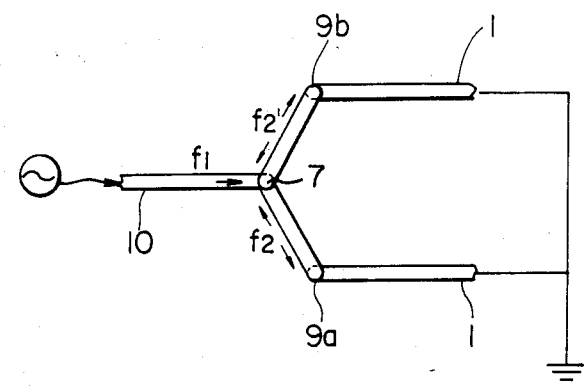

FIGS. 6 and 7 are respectively partial sectional front and plan views of an earthing switch according to another embodiment of the present invention; and FIGS. 8 and 9 are respectively schematic current path diagrams of the earthing switch of FIGS. 6 and 7.

Embodiments will be described with reference to the drawings.

An earthing switch shown in FIGS. 3 and 4 differs from the conventional one in the structure of an earthing bar, and hence the description will be made as to this difference point.

To connect an operating mechanism case 4 with an enclosure 1, two earthing bars 9a and 9b are employed, and both the earthing bars 9a and 9b are disposed in a plane including a moving contact 7 and perpendicular to a main conductor 10 so as to be substantially symmetrical with respect to the moving contact 7. The lower ends of the earthing bars 9a and 9b are connected to both sides of the enclosure 1, respectively and these lower end connection points are disposed on a horizontal plane including the conductor 10.

Describing as to the connection of the earthing bars 9a and 9b more concretely, one ends of the earthing bars 9a and 9b are removably connected to a flange portion 4a of the operating mechanism case 4 with bolts 13, 13 and the other ends are also connected removably by bolts 14, 14 to connection pedestals 12a and 12b which are protruded from the outer surface of the closure 1 opposite to each other. Other structures are similar to the conventional earthing switch and hence descriptions are omitted.

Figure 5:
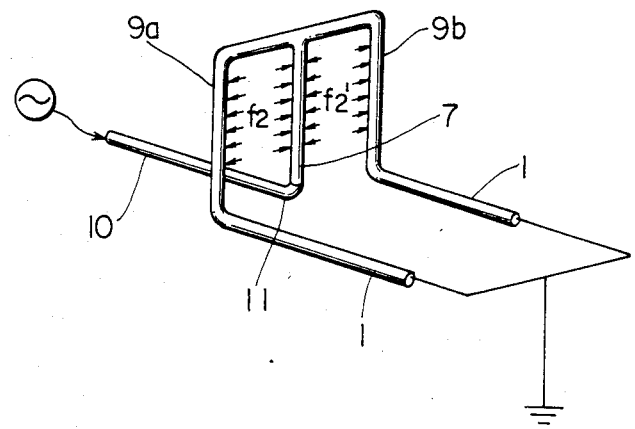
FIG. 5 is a schematic current path diagram of the earthing switch of FIG. 3.

FIG. 5 shows a current path schematically when the earthing switch is turned on.

Since the earthing bars 9a and 9b are located on both sides of the moving contact 7 symmetrically, the generated electromagnetic repulsion forces $f_2$ and $f_2'$ act on the moving contact 7 in such directions, as shown by the arrows, so that these forces $f_2$ and $f_2'$ are cancelled with each other. As a result, the bending force due to the electromagnetic forces scarcely act on the moving contact 7, and hence the moving contact 7 can be made thin.

In this embodiment, the lower ends of the earthing bars 9a and 9b are connected to the connection pedestals 12a and 12b provided on both sides of the enclosure 1 so as to be substantially aligned with the stationary contact 11. Such an alignment is, however, not necessarily required, as will be seen from the next embodiment, if the electromagnetic repulsion forces $f_2$ and $f_2'$ are made sufficiently large as compared with the electromagnetic repulsion force between the conductor 10 and the moving contact 7, the latter can be neglected with respect to a force to hold the moving contact 7 by the former. If the force $f_1$ is small and the above effect is not required, the earthing bars 9a and 9b can be connected to the enclosure 1 at any positions thereon, and thus in case of an earthing switch having a branch tube 2 and a moving contact 7 of a long axial length, the earthing bars 9a and 9b may be connected to the enclosure at positions thereon displaced forward or backward along the axis of the conductor 10 from the positions aligned traversely with the moving contact 7. However, in applying to an actual earthing switch, it is desirable to decide the connecting positions in consideration of a balance between the total electromagnetic forces acting on the moving contact 7 as the bending force and the electromagnetic forces cancelling each other. The similar effects can be attained even when the lower positions of the earthing bars 9a and 9b are shifted more or less upward or downward.

In an earthing switch shown in FIGS. 6 and 7, a countermeasure against the electromagnetic repulsion forces between the conductor 10 and the moving contact 7 is employed. Such an arrangement can be applied, in particular, to an earthing switch in which a branch tube 2 is formed on an enclosure 1 in its radial direction.

Figure 3:
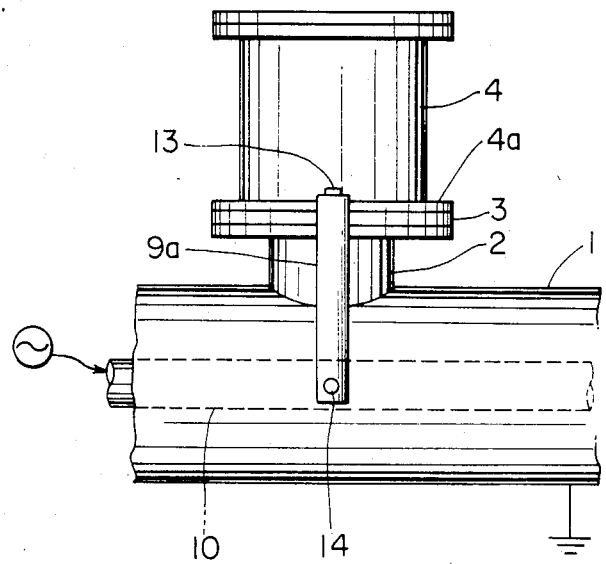
FIGS. 3 and 4 are respectively front view and partial sectional side view of an earthing switch according to one embodiment of the present invention.
Figure 4:
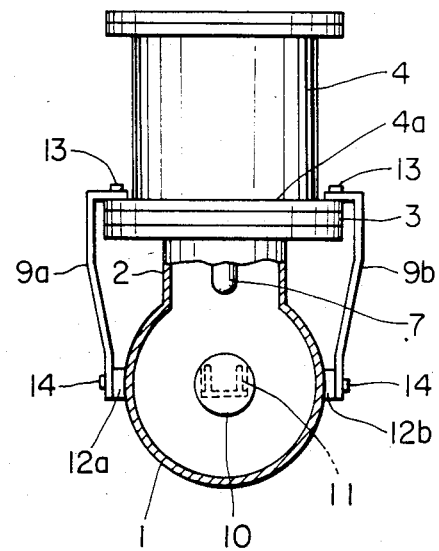

The emboidment of FIGS. 6 and 7 is the same as the embodiment of FIGS. 3 and 4 in that the earthing bars 9a and 9b are formed on a plane perpendicular to the axis of the conductor 10, but different in that the moving contact 7 and the earthing bars 9a and 9b are not on the same plane. In other words, the earthing bars 9a and 9b are located at a predetermined distance from a plane perpendicular to the conductor 10 and including the moving contact 7 towards a side of the conductor 10 opposite to its power supply side, i.e. the right side as viewed in FIG. 6. Also in this case, the earthing bars 9a and 9b are removably connected to connection pedestals 12a and 12b, and although the lower ends of the earthing bars 9a and 9b can be moved upward or downward more or less, the most preferred positions of the lower ends of the earthing bars 9a and 9b are those positions which are aligned with the stationary contact 11.

A current path in such an earthing switch is schematically shown in FIGS. 8 and 9.

On the moving contact 7, an electromagnetic repulsion force $f_1$ between the moving contact 7 and the conductor 10, an electromagnetic repulsion force $f_2$ between the moving contact 7 and the earthing bar 9a, and an electromagnetic repulsion force $f_2'$ between the moving contact 7 and the earthing bar 9b, act respectively. Each of the electromagnetic repulsion forces $f_2$ and $f_2'$ can be divided into a component perpendicularly to the direction of the conductor 10 and a component parallel to the conductor 10. The perpendicular components of the forces $f_2$ and $f_2'$ are cancelled with each other, and the parallel components of the forces $f_2$ and $f_2'$ are opposed to and cancelled with the electromagnetic repulsion force $f_1$. As a result, the moving contact 7 can be moved easily along the axis thereof, and the diameter of the moving contact 7 can be made thin. The parallel components of the forces $f_2$ and $f_2'$ vary with variation of the displacement of the earthing bars 9a and 9b from the moving contact 7 in the direction of the conductor 10 and hence it is preferable to decide there factors based on calculations or experiments.

In each of the embodiments, descriptions are given as to the earthing switches of a single phase. However, the arrangements described are applicable to a three-phase common enclosure earthing switch, an earthing switch in which only the conductors in the enclosure are consolidated in a three-phase type, and other earthing switches of generally known various structures.

In the earthing switch for gas-insulated switchgear apparatus arranged in accordance with the present invention, the earthing bars are disposed separately on both sides of the moving contact, and at least a part of the electromagnetic repulsion forces generated between the moving contact and these earthing bars can be cancelled with each other. As a result, the influence of the electromagnetic forces acting on the moving contact as a bending force can be reduced, and the moving contact and operating mechanism section, etc., can be made in a small size. Therefore, advantageous results can be achieved in that a small-sized earthing switch can be obtained.

We claim:

1. An earthing switch for gas-insulated switchgear apparatus comprising a gas-insulated enclosure, a main conductor disposed in said enclosure, a stationary contact provided to said main conductor, an operating mechanism case accommodating a moving contact which is movable to connect with and disconnect from said stationary contact and an operating mechanism for operating said moving contact, said case being mounted on said enclosure interposing an insulating member therebetween, and earthing means for removably providing electrical connection between said movable contact and said enclosure and including at least two earthing bars each having one end connected to said operating mechanism case and an opposite end connected to said enclosure, said two earthing bars being disposed outside of said enclosure near to said moving contact and located on opposite sides with respect to said moving contact.

2. An earthing switch according to claim 1 wherein said moving contact is movable along its axial direction intersecting said main conductor at a right angle, and said earthing bars are disposed on a plane perpendicular to said main conductor.

3. An earthing switch according to claim 1 wherein ends of said earthing bars are connected to the outer surface of said enclosure respectively at positions substantially corresponding to said stationary contact.

4. An earthing switch according to claim 2 wherein said moving contact is movable in said plane on which said earthing bars are disposed.

5. An earthing switch according to claim 2 wherein said plane on which said earthing bars are disposed is displaced by a predetermined distance away from the axis of said moving contact in an axial direction of said main conductor.

6. An earthing switch according to claim 1 wherein a branch tube having a flange is provided to said enclosure at its portion opposite to said stationary contact of said main conductor, the flange of said branch tube is removable coupled with a flange of said operating mechanism case with bolts interposing the insulating member therebetween, connection pedestals are formed on the outer surface of said enclosure respectively on both sides thereof at positions opposite to said main conductor, and one end of each of said earthing bars is connected removably to the flange of said operating mechanism case and the other end thereof is connected removably to a corresponding one of said connection pedestals.

7. An earthing switch for gas-insulated switchgear apparatus comprising a gas-insulated enclosure provided with a branch tube having a flange, a main conductor disposed in said enclosure, a stationary contact provided to said conductor at its portion opposing to the branch tube of said enclosure, an operating mechanism case having a flange removably coupled to the flange of said branch tube by bolts with an insulating member interposed therebetween, a moving contact mounted in said mechanism case and movable to connect with and disconnect from said stationary contact, an operating mechanism mounted in said mechanism case for operating said moving contact, and earthing means for removably providing electrical connection between said enclosure and said mechanism case, said earthing means including at least two earthing bars, each having one end connected to the flange of said mechanism case and an opposite end removably connected to a corresponding one of connection pedestals formed on an outer surface of said enclosure and located at its opposite sides with respect to said main conductor.

* * * * *